United States Patent
Tsyrganovich

(10) Patent No.: US 10,447,157 B2
(45) Date of Patent: *Oct. 15, 2019

(54) SYNCHRONOUS SENSING OF INDUCTOR CURRENT IN A BUCK CONVERTER CONTROL CIRCUIT

(71) Applicant: Littelfuse, Inc., Chicago, IL (US)

(72) Inventor: Anatoliy V. Tsyrganovich, Woodside, CA (US)

(73) Assignee: LITTELFUSE, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,475

(22) Filed: Aug. 14, 2018

(65) Prior Publication Data

US 2019/0103810 A1    Apr. 4, 2019

Related U.S. Application Data

(63) Continuation of application No. 15/693,494, filed on Sep. 1, 2017, now Pat. No. 10,050,527, which is a continuation of application No. 14/474,132, filed on Aug. 30, 2014, now Pat. No. 9,780,648.

(51) Int. Cl.
*H02M 3/156* (2006.01)
*H02M 1/00* (2006.01)

(52) U.S. Cl.
CPC .... *H02M 3/156* (2013.01); *H02M 2001/0009* (2013.01)

(58) Field of Classification Search
CPC ...................... H02M 3/156; H02M 2001/2009
See application file for complete search history.

(56) References Cited

U.S. PATENT DOCUMENTS

| 5,481,178 A | * | 1/1996 | Wilcox | H02M 3/156 |
| | | | | 323/224 |
| 5,555,165 A | * | 9/1996 | Vinciarelli | H02M 3/10 |
| | | | | 363/20 |

(Continued)

*Primary Examiner* — Jue Zhang
*Assistant Examiner* — Bart Iliya

(57) ABSTRACT

A sense resistor is placed in series with an output capacitor of a buck converter. The buck converter operates in a discontinuous mode such that there is a dead time in each switching cycle. A control circuit senses a voltage across the sense resistor and thereby generates a first signal $I_{CS}$. The control circuit detects an offset voltage in $I_{CS}$, where the offset voltage is the voltage of $I_{CS}$ during the dead time in a first switching cycle. The control circuit level shifts the entire $I_{CS}$ by the offset voltage, thereby generating a second signal $I_{CLS}$. $I_{CLS}$ has the same waveform as the waveform of the inductor current. In a second cycle, $I_{CLS}$ is used to determine when to turn off the main switch and when the start of the dead time occurs. $I_{CLS}$ and the offset voltage are used together to determine when to turn the main switch on.

15 Claims, 4 Drawing Sheets

(56) References Cited

U.S. PATENT DOCUMENTS

| | | | | |
|---|---|---|---|---|
| 6,127,814 A | * | 10/2000 | Goder | H02M 3/1588 323/282 |
| 2013/0200869 A1 | * | 8/2013 | Sasao | G05F 1/46 323/282 |

* cited by examiner

BUCK CONVERTER SYSTEM

6-BIT ADC

HW LUT

SYNCHRONOUS SENSING OF INDUCTOR CURRENT IN A BUCK CONVERTER CONTROL CIRCUIT

CROSS-REFERENCE

This application is a continuation of U.S. patent application Ser. No. 15/693,494, filed Sep. 1, 2017, now U.S. Pat. No. 10,050,527, which is a continuation of U.S. patent application Ser. No. 14/474,132, filed Aug. 30, 2014, now U.S. Pat. No. 9,780,648, the entire contents of which are incorporated herein by reference.

TECHNICAL FIELD

The described embodiments relate generally to buck converters, and to control circuits for controlling buck converters, and to related methods.

BACKGROUND INFORMATION

One of the common power converter topologies is that of a step-down DC-to-DC buck converter. In controlling the switching of the main switch in such a buck converter, current sensing is typically employed. For example, the controller may detect a peak inductor current and a load current and then based at least in part on these detections may adjust the timing of the switching of the main switch. To detect the peak inductor current, a current transformer may be used where the secondary winding outputs a current signal whose magnitude is proportional to the magnitude of the current signal in the primary. Accuracy of this type of current sensing will vary with parameters of the transformer. To measure load current, a small resistance may be placed in series with the load of the buck converter, thus providing a voltage signal that is proportional to load current. Alternative ways of monitoring and controlling buck converter operation are sought.

SUMMARY

A sense resistor is placed in series with an output capacitor of a step-down DC-to-DC buck converter. A control circuit of the buck converter operates the buck converter in a discontinuous mode such that in each switching cycle of the buck converter the inductor current increases to a peak, then decreases, and then for a "dead time" remains substantially constant at a zero value. A control circuit of the buck converter senses the voltage drop across the sense resistor and thereby generates a first signal $I_{CS}$. The first signal $I_{CS}$ represents the flow of current through the output capacitor throughout the switching cycle. The control circuit detects an offset voltage present in this first signal $I_{CS}$, where the offset voltage is the instantaneous value of the voltage signal $I_{CS}$ during a point in the dead time of a first switching cycle. The control circuit level shifts the entire first signal $I_{CS}$ by this detected offset voltage, thereby generating a second level-shifted signal $I_{CLS}$. The second signal $I_{CLS}$ has a voltage waveform that is substantially the same as the waveform of the inductor current, yet the inductor current flowing through the inductor is not being directly sensed. The amplification gain in generating the first signal $I_{CS}$ and the gain in generating the detected offset voltage are set such that the resulting second signal $I_{CLS}$ is usable by the control circuit as a fairly accurate indicator of the instantaneous inductor current as the inductor current varies up and down over a switching cycle. The control circuit uses the second signal $I_{CLS}$ to determine when to turn off the buck converter's main switch in a second switching cycle, and to determine when the start of the dead time occurs in the second switching cycle. The control circuit also uses the second signal $I_{CLS}$ in combination with the detected offset voltage to determine when to turn on the main switch at the end of the second switching cycle. In one example, the control circuit includes a mass-produced general purpose microcontroller and a special purpose companion buck controller integrated circuit. All the steps set forth above can be carried out by the controller integrated circuit, or various ones of the steps can be performed by the microcontroller and controller integrated circuit working together.

The method described above of detecting the voltage signal across the sense resistor and generating the first signal $I_{CS}$, of detecting the offset voltage in that signal during a "dead time", and of level shifting the voltage signal $I_{CS}$ by the offset voltage amount so as to generate a second signal $I_{CLS}$ (whose waveform is substantially the same as the waveform of the inductor current) need not be performed using analog amplifiers, analog offset detector circuitry, and analog level-shift circuitry. In one embodiment, the method is performed using digital circuitry by digitizing the voltage signal across the sense resistor to generate a stream of digital values throughout each switching cycle, and doing the remaining steps (of detecting the offset voltage and of level-shifting) in the digital domain.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
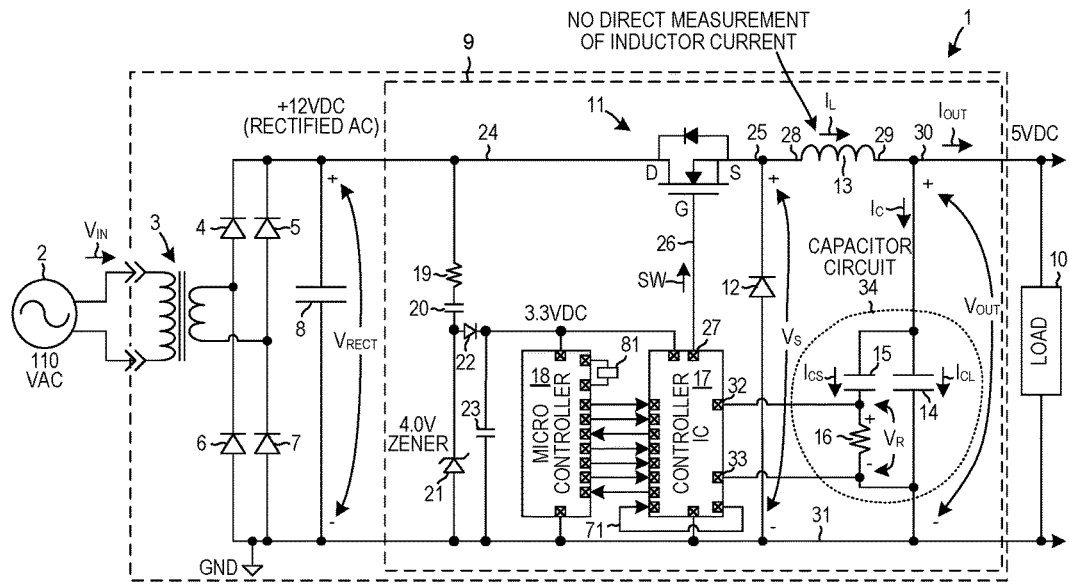
FIG. 1 is a circuit diagram of a buck converter system in accordance with one novel aspect.

FIG. 1 is a diagram of a step-down buck converter system 1 in accordance with one novel aspect. System 1 includes a 110 volt RMS AC power source 2, a step-down transformer 3, a bridge rectifier 4-7, an input capacitor 8, a step-down buck converter 9, and a load 10. The sinusoidal 110 volt AC signal VIN is reduced to a sinusoidal signal of smaller voltage amplitude, and this sinusoidal signal of smaller voltage amplitude is full wave rectified by the bridge rectifier 4-7 into a +12 volt rough DC voltage VRECT. Buck converter 9 includes a main switch 11, a free-wheeling switch 12, an inductor 13, a large output capacitor 14, a smaller output capacitor 15, a sense resistor 16, a controller integrated circuit 17, a microcontroller integrated circuit 18, and components 19-23, 81. The components 19-23 draw power from conductor and node 24, and supply the integrated circuits 17 and 18 with a 3.3 volt DC supply voltage. There are other ways of powering the integrated circuits. The components 19-23 are presented here as just one example.

The main switch 11 in this case is an N-channel field effect power transistor whose drain terminal is coupled to the input node 24 of the converter, and whose source terminal is coupled to a switching node 25, and whose gate terminal is coupled via conductor 26 to a SW terminal 27 of the controller integrated circuit 17. A first end 28 of the inductor 13 is coupled to the switching node 25. A second end 29 of the inductor 13 is coupled to an output node and terminal 30 of the converter. The free-wheeling switch 12 in this case is a diode, but in other embodiments it may be a transistor or other type of switch that is controlled to be conductive at the appropriate times. The cathode of the diode is coupled to the switching node 25, whereas the anode of the diode is coupled to a ground node and terminal 31 of the converter. A first terminal of the large output capacitor is coupled to the output node 30 of the converter, and a second terminal of the large output capacitor is coupled to the ground node 31 of the converter. The smaller output capacitor 15 and the sense resistor 16 are coupled together in series between the output node 30 and the ground node 31 as illustrated. A first input terminal 32 of the control circuit is coupled to one lead of the sense resistor and a second input terminal 33 of the control circuit is coupled to the other lead of the sense resistor. The microcontroller 18 and the control circuit 17 are coupled together via terminals and conductors as illustrated.

Figure 2:
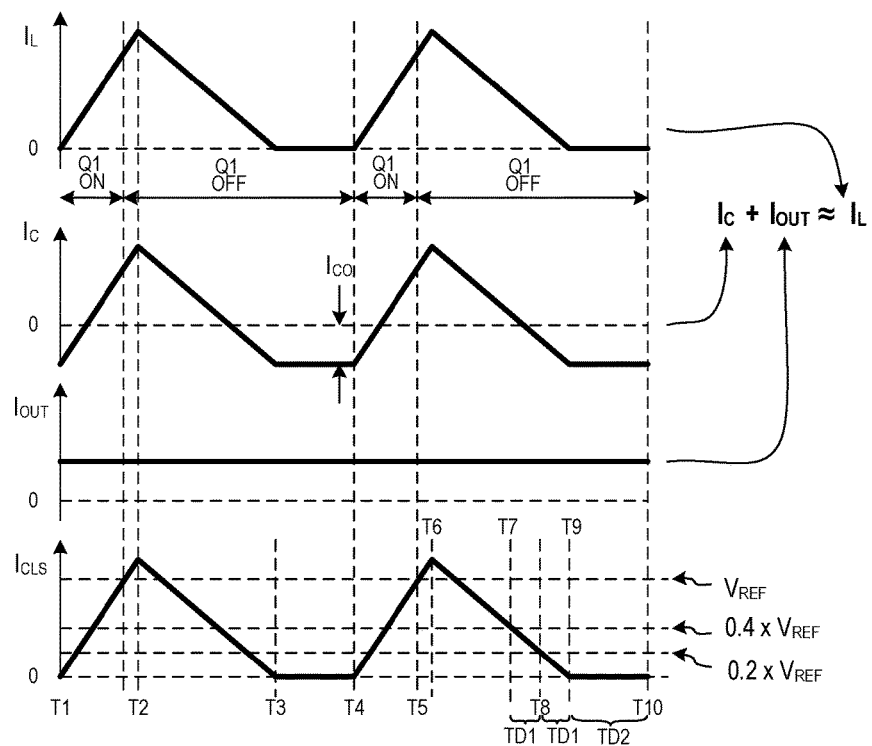
FIG. 2 is a waveform diagram that illustrates an operation of the buck converter system of FIG. 1.

FIG. 2 is a waveform diagram that illustrates an operation of the buck converter system 1 of FIG. 1. The upper waveform labeled $I_L$ represents the current flowing through the inductor 13 and to the output node 30. The middle waveform labeled $I_C$ represents the current flowing from the output node 30 and to the capacitor circuit 34. The waveform labeled $I_{CLS}$ represents the current flowing out of the converter from the output node 30. The lower waveform labeled represents a synthesized level-shifted version of the $I_C$ signal as described in further detail below.

Two switching cycles are illustrated in FIG. 2. The first switching cycle extends from time T1 to time T4. The second switching cycle extends from time T4 to time T10. In the first cycle, the main switch 11 is closed at time T1 and current begins increasing in the inductor. The current flows through the main switch, and through the inductor, and to the output node 30. The main switch is then turned off, and the inductor current peaks at time T2. The inductor current then decays from time T2 until time T3. During the decay time, the main switch is off. Current flows from the ground node 31, up through the diode 12 to switching node 25, and from node 25 through the inductor 13, and to the output node 30. From time T3 to time T4 the inductor current is fairly constant at a zero value. Assuming a relatively small load and a relatively large output capacitor capacitance, the output current IOUT is assumed to be fairly constant throughout the switching cycle. The waveform labeled IOUT in FIG. 2 is therefore drawn in simplified form as a straight line. The time in a switching cycle when the inductor current is substantially constant and substantially zero is referred to here as the "dead time" or the "discontinuous" time. There is one such "dead time" in each switching cycle. The controller integrated circuit 17 adjusts the duration of the dead time from switching cycle to switching cycle in order to control the amount of power supplied to the load and in order to control the voltage on the output node 30 so that the output voltage VOUT remains a constant 5 volts DC. If the load is light, then the duration of the dead time is increased, whereas if the load is heavy then the duration of the dead time is decreased.

In order to determine how to control the duration of the dead time, the magnitude of the load current $I_{OUT}$ is detected or determined. By examining current flow into and out of node 30, it is noted that $I_L$ is roughly equal to the sum of $I_C$ and $I_{OUT}$. Because it is the controller integrated circuit that controls the main switch to turn on in a switching cycle, the controller integrated circuit can sense or determine the magnitude of the current $I_C$ immediately before or at the time the main switch is turned on. Because the resistance of sense resistor 16 is very small, the current flow $I_{CS}$ through the small capacitor 15 is directly proportional to the current flow $I_{CL}$ through the larger capacitor 14. The voltage drop across the sense resistor is therefore indicative of the overall capacitor current $I_C$. The relationship between a change in the voltage drop across the sense resistor and a corresponding change in the capacitor current $I_C$ can be calculated, and is therefore known. In this way, the DC magnitude of the current $I_C$ is measured (measured indirectly by measuring $I_{CS}$) at the time when the main switch is closed at time T4. This detected voltage is then added as an offset to the detected $I_{CS}$ waveform, thereby generating a level-shifted signal $I_{CLS}$ ("$I_C$ Level Shifted") whose waveform matches, or substantially matches, the waveform of the $I_L$ inductor current. The correspondence between a voltage on the $I_{CLS}$ waveform and a corresponding current of the $I_L$ waveform is known, so the current through the inductor 13 is effectively detected or sensed without there being any transformer current sensing or other current sensing of the current in the inductor circuit branch leading into the output node. The amplification gain in generating the first signal $I_{CS}$ and the gain in generating the detected offset voltage are set such that the resulting second signal $I_{CLS}$ is usable by the control circuit as a fairly accurate indicator of the instantaneous inductor current as the inductor current varies up and down over a switching cycle. Because the capacitance of the small capacitor 16 is much smaller than the capacitance of the larger capacitor 14, and because the resistance of the sense resistor 16 is small, the power dissipated by the sense resistor is minimal. In one example, the capacitance of the smaller capacitor 15 is one tenth the capacitance of the larger capacitor 14, and the resistance of the sense resistor 16 is ten milliohms. The resistance through the small capacitor at 100 kHz is about twenty two milliohms.

Once the level-shifted signal $I_{CLS}$ has been generated, it is analyzed by the controller integrated circuit 17 and/or the microcontroller integrated circuit 18 to determine how to control the switching of the main switch 11. The level-shifted signal $I_{CLS}$ is a voltage signal, whose waveform is indicative of the waveform of the inductor current $I_L$ as described above. In the second switching cycle illustrated in FIG. 2, the controller integrated circuit 17 compares a reference voltage $V_{REF}$ to the level-shifted signal $I_{CLS}$. The controller integrated circuit detects when the signal $I_{CLS}$ first exceeds the voltage $V_{REF}$ at time T5, and in response the controller integrated circuit detects the signal SW thereby initiating the turn off of the main switch. After a delay the main switch turns off, the signal $I_{CLS}$ peaks at time T6, and the signal $I_{CLS}$ begins decreasing. Next, the controller integrated circuit monitors the $I_{CLS}$ signal to determine or detect the beginning of the "dead time". In one example, the controller integrated circuit 17 compares a first voltage (0.4 times $V_{REF}$) to the signal $I_{CLS}$. Simultaneously, the controller integrated circuit also compares a voltage of half that magnitude (0.2 times $V_{REF}$) to the signal $I_{CLS}$. The controller integrated circuit detects when the signal $I_{CLS}$ drops below the first voltage (0.4 times $V_{REF}$) but is still above the second voltage (0.2 times $V_{REF}$). The signal $I_{CLS}$ then drops further. The controller integrated circuit detects when the signal $I_{CLS}$ drops below the second voltage (0.2 times $V_{REF}$). The controller integrated circuit determines the amount of time TD1 between these the two detections, and then determines when an equal amount of time TD1 has elapsed after time T8. The controller integrated circuit 17 determines the start of the "dead time" to be when the equal amount of time TD1 has elapsed after time T8.

In a first example, the controller integrated circuit outputs a signal SDT ("Start of Dead Time") to the microcontroller that indicates when the start of the dead time is as determined by the controller integrated circuit in this way. The controller integrated circuit also digitizes the detected magnitude of the IC offset, and sends that digital information as a multi-bit signal and value ICO ("IC Offset") across a serial communication link to the microcontroller. The microcontroller then determines a desired dead time duration TD2 starting at the start of the dead time as signaled by the controller integrated circuit. The desired dead time duration TD2 is a function of the magnitude of the IC offset as that value is communicated to the microcontroller. When the microcontroller determines that the dead time has expired, the microcontroller sends a trigger signal TRIG to the controller integrated circuit. The trigger signal TRIG is received on a UC TRIG IN terminal of the controller integrated circuit and causes the controller integrated circuit to turn on the main switch. The next switching cycle then starts.

In a second example, the controller integrated circuit 17 does not need the microcontroller 18 to signal it when the dead time duration TD2 has expired, but rather the controller integrated circuit 17 itself determines when the dead time duration TD2 shall expire. The controller integrated circuit adjusts the dead time duration TD2 from cycle to cycle as a function of the magnitude of the $I_C$ offset. In one specific example, the controller integrated circuit 17 includes a down counter. The down counter starts counting down at the determined start of the dead time. The down counter starts counting down from an initial count value. When the count of the down counter reaches a count of zero, then the down counter outputs a trigger pulse AUTO TRIG that causes the main switch to be turned on. This signal is referred to as an "auto trigger" signal because the controller integrated circuit itself triggers the turning on main switch to initiate the next switching cycle, and does so without the help of the microcontroller. A hardware lookup table circuit within the controller integrated circuit supplies one of a plurality of initial count values to the down counter, where which particular initial count value it is that is supplied to the down counter is determined by the magnitude of the $I_C$ offset. If the $I_C$ offset is relatively large, then the hardware lookup table circuit supplies the down counter with an initial count value that is relatively small so that the dead time duration TD2 will be relatively small. If the $I_C$ offset is relatively small, then hardware lookup table circuit supplies the down counter with an initial count value that is relatively large so that the dead time duration TD2 will be relatively large.

In one particular embodiment, during a start up time of the buck converter system the controller integrated circuit auto triggers itself from switching cycle to switching cycle. When the main switch turns on in each switching cycle is controlled by the controller integrated circuit, and when the main switch turns off in each switching cycle is also controlled by the controller integrated circuit. After an amount of time of operating in this "auto trigger mode", the microcontroller disables auto trigger operation of the controller integrated circuit by deasserting an enable signal AUTO TRIG EN. The AUTO TRIG EN signal is received onto the controller integrated circuit via an AUTO TRIG EN terminal. If the AUTO TRIG EN signal is asserted then the auto triggering mode is enabled, whereas if the AUTO TRIG EN is not asserted then the microcontroller can trigger the controller integrated circuit to turn on the main switch. In the present case, the auto trigger mode is disabled. The microcontroller supplies the trigger signal TRIG to the controller integrated circuit. The trigger signal TRIG is received onto the UC TRIG IN terminal of the controller integrated circuit. The trigger signal TRIG triggers the controller integrated circuit to turn on the main switch at the proper time in each switching cycle. When the main switch turns is therefore controlled by the microcontroller, whereas when the main switch turns off is handled by the controller integrated circuit. The microcontroller monitors the load current by receiving the serial multi-bit value $I_{CO}$ from the controller integrated circuit via the serial link.

Figure 3:
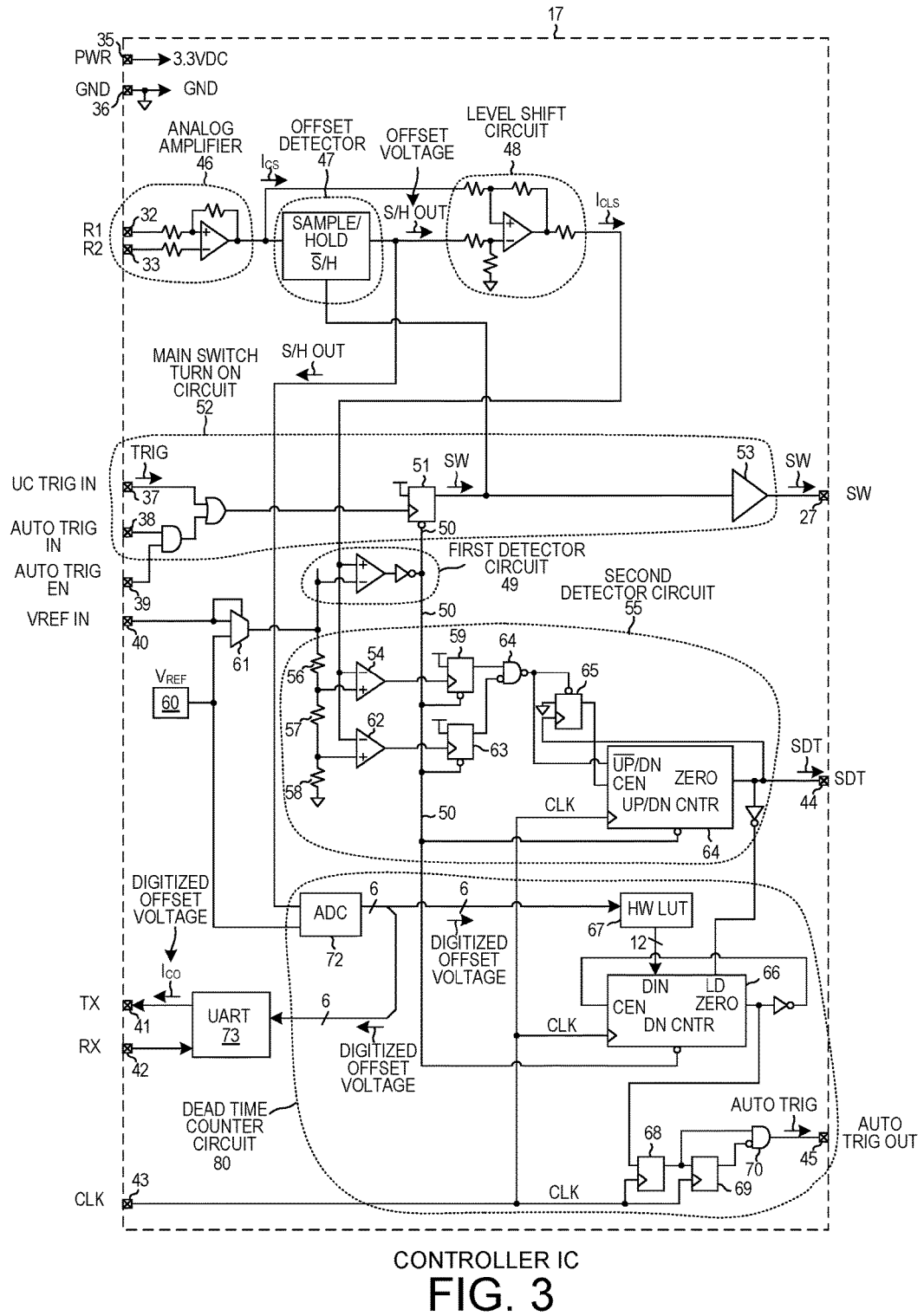
FIG. 3 is a more detailed circuit diagram of one specific embodiment of the controller integrated circuit of the buck converter system of FIG. 1.

FIG. 3 is a more detailed diagram of one specific example of the controller integrated circuit 17 of FIG. 1. The controller integrated circuit 17 has terminals including a power terminal 35, a ground terminal 36, the R1 terminal 32, the R2 terminal 33, the UC TRIG IN terminal 37, the AUTO TRIG IN terminal 38, the AUTO TRIG EN terminal 39, a VREF input terminal 40, a UART TX terminal 41, a UART RX terminal 42, a clock signal input terminal 43, the main switch drive SW terminal 27, the start of dead time SDT terminal 44, and the AUTO TRIG OUT terminal 45. The voltage drop across the sense resistor 16 is present between the R1 and R2 terminals as mentioned above. An analog amplifier 46 amplifies this signal and outputs a first signal $I_{CS}$ ($I_{CS}$ is a voltage signal whose magnitude is proportional in a known way to the overall capacitor current $I_C$). The resulting amplified signal $I_{CS}$ is supplied to an offset detector circuit 47. A sample and hold circuit of the offset detector circuit 47 is controlled by the SW signal to sample during the dead time and to begin holding when the SW signal transitions high at the beginning of a switching cycle. The sample and hold circuit therefore detects the magnitude of the first signal $I_{CS}$ at a time immediately before the main switch turns on. A level shift circuit 48 receives the first signal $I_{CS}$ and the S/H OUT signal from the offset detector, and level shifts the signal $I_{CS}$ by the S/H OUT amount, thereby generating a second signal $I_{CLS}$. In FIG. 3, the second signal is a level-shifted version of the signal $I_{CS}$ and is a scaled version of the overall capacitor current signal $I_C$. The waveform of the level-shifted signal matches the waveform of the current flowing through the inductor 13. The second signal $I_{CLS}$ is supplied to a first detector circuit 49. A reference voltage $V_{REF}$ is also supplied to the first detector circuit 49. The first detector circuit 49 detects when the signal $I_{CLS}$ has risen so that it exceeds the $V_{REF}$ value. When the first detector circuit detects that $I_{CLS}$ exceeds $V_{REF}$, then the first detector circuit 49 drives a digital logic low signal onto conductor 50 and onto the asynchronous reset input of flip-flop 51 of the main switch turn on circuit 52. The resetting of flip-flop 51 causes the signal SW on terminal 27 to transition to a digital logic low, and this in turn turns the main switch 11 off. The triangle symbol 53 represents a conventional bootstrap high-side driver circuit. Additional terminals and additional external components necessary for the operation of the bootstrap high-side driver circuit are known in the art and are not illustrated in FIG. 3.

The turning off of the main switch causes the magnitude of the second signal $I_{CLS}$ to start decreasing from its peak. Comparator 54 of the second detector circuit 55 detects when the second signal $I_{CLS}$ has dropped below a first voltage (0.4 times $V_{REF}$). The first voltage (0.4 times $V_{REF}$) is generated from $V_{REF}$ by a resistor voltage divider 56-58 and is supplied onto the noninverting input lead of comparator 54. When the signal $I_{CLS}$ falls below the first voltage (0.4 times $V_{REF}$), the comparator output signal transitions high, and this clocks a digital high into the flip-flop 59. $V_{REF}$ can be supplied from an external source via $V_{REF}$ IN terminal 40. Alternatively, if this $V_{REF}$ terminal 40 is grounded by an external connection, then a $V_{REF}$ from an internal voltage reference source 60 is used to drive the resistor voltage divider. Reference numeral 61 denotes an analog multiplexer.

Comparator 62 detects when the second signal $I_{CLS}$ has dropped below a second voltage that is half of the first voltage detected by comparator 54. In this case, the second voltage detected by comparator 62 is 0.2 times $V_{REF}$. When $I_{CLS}$ drops below this second voltage (0.2 times $V_{REF}$), the comparator output signal transitions high, and this clocks a digital high into the flip-flop 63.

The up/down counter 64 is initially cleared when the voltage of $I_{CLS}$ is higher than $V_{REF}$. Now that the voltage of Ictus is decreasing and is below $V_{REF}$, the up-down counter 64 is in a cleared state, but it is not being cleared, and it is not enabled to count because the signal on its CEN input lead is not asserted. If the voltage of the signal $I_{CLS}$ drops below the first voltage (0.4 times $V_{REF}$) but has not yet dropped below the second voltage (0.2 times $V_{REF}$), then the NAND gate 64 outputs a low signal. The low signal asynchronously sets the flip-flop 65, and the setting of the flip-flop 65 causes the count enable signal CEN to be asserted. The UP/DN control signal to the up-down counter 64 is low, so the up-down counter 64 starts counting up from zero. This continues for a period of time TD1 until the comparator 62 detects that ICLS has dropped below the second voltage (0.2 times $V_{REF}$), at which time the NAND gate 64 outputs a digital high. The digital high is supplied to the UP/DN control of the up-down counter 64, so the up-down counter switches to count down. After another amount of time TD1, the counter count reaches zero. When the count reaches zero, the ZERO output signal of the up-down counter is asserted to a high digital logic level. The transitioning of the ZERO signal to a digital logic high causes the flip-flop 65 to clock in a digital logic low, which in turn drives a digital logic low onto the count enable input CEN of the up-down counter and disables the counting of the up-down counter. The ZERO signal as output by the up-down counter 64 is driven onto the SDT terminal 44, and from that terminal is supplied to an input terminal of the microcontroller 18. By monitoring this SDT signal, the microcontroller 18 detects the beginning of the "dead time". A clock signal CLK is supplied to the up-down counter 64 and to a down counter 66 via clock signal input terminal CLK 43. The clock signal may be generated by an oscillator in the microcontroller.

When the SDT signal was low before the start of the dead time, a digital logic high signal was supplied onto the asynchronous load input LD of the down counter 66 of a dead time counter circuit 80. The down counter 66 therefore was held in a state in which a 12-bit value from a HW LUT 67 was being asynchronously loaded into the down counter 66. The ZERO output of the down counter 66 therefore was also held low. When the SDT signal transitions high at the start of the dead time, the asynchronous load signal being supplied onto the LD input lead of the down counter 66 is removed. At this point, the down counter 66 begins counting down from the initial 12-bit value. After an amount of time TD2, the down counter has counted down to where the count is zero. When the count reaches zero, the ZERO output signal of the down counter is asserted high. This causes the count enable signal supplied onto the CEN input lead of the down counter to be removed, and the down counter stops counting. The low-to-high transition of the ZERO signal output by the down counter 66 is captured by a low-to-high transition detector circuit involving components 68-70. The low-to-high transition detector circuit outputs a high pulse of the signal AUTO TRIG. The high pulse of the signal of the AUTO TRIG signal is supplied via AUTO TRIG terminal 45 and a board level conductor 71 to the AUTO TRIG IN terminal 38. As explained above, if the AUTO TRIG EN signal on the AUTO TRIG EN terminal 38 is asserted, then the high pulse of the AUTO TRIG signal is supplied to the clock input lead of the flip-flop 51, thereby setting the flip-flop 51 and causing the SW signal to transition high. The transitioning high of the SW signal causes the main switch to be turned on, and another switching cycle starts.

The offset value of the $I_C$ signal as detected by the offset detector 47 is the signal S/H OUT in FIG. 3. This S/H OUT signal is indicative of the magnitude of the output current IOUT as explained above in connection with FIG. 2. This S/H OUT signal is digitized into a 6-bit digital value by analog-to-digital converter (ADC) 72, and this 6-bit value is communicated to the microcontroller as a multi-bit digital value $I_{CO}$ via a UART (Universal Asynchronous Receiver/Transmitter) 73 and TX terminal 41 and a board level conductor. The microcontroller receives the 6-bit value $I_{CO}$. By monitoring the $I_{CO}$ values received from the controller integrated circuit, the microcontroller monitors the magnitude of the output current $I_{OUT}$.

Figure 4:
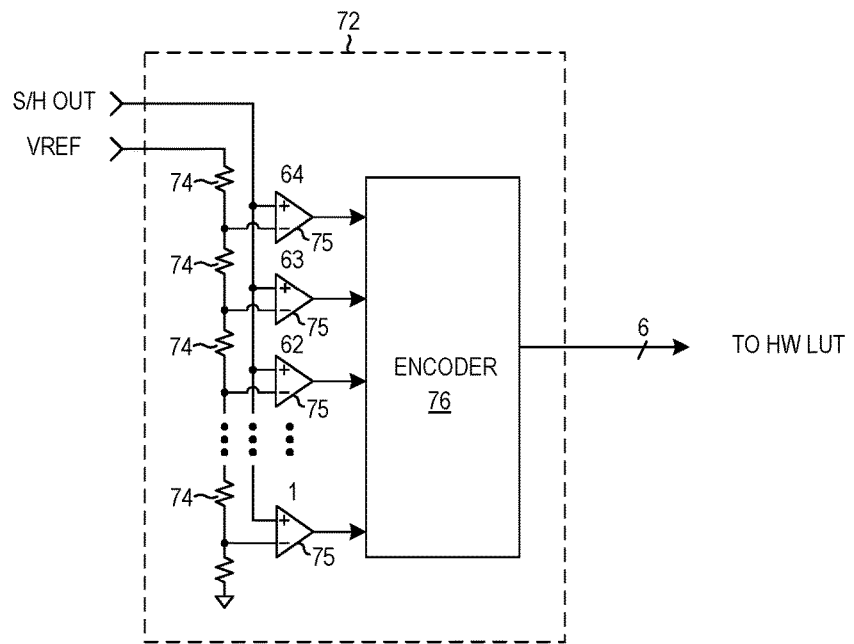
FIG. 4 is a more detailed circuit diagram of the 6-bit ADC in the controller integrated circuit of FIG. 3.

FIG. 4 is a more detailed diagram of one specific example of the ADC 72 of FIG. 3. ADC 72 is a flash converter that includes a resistor divider 74, a set 75 of sixty-four comparators, and an encoder 76.

Figure 5:
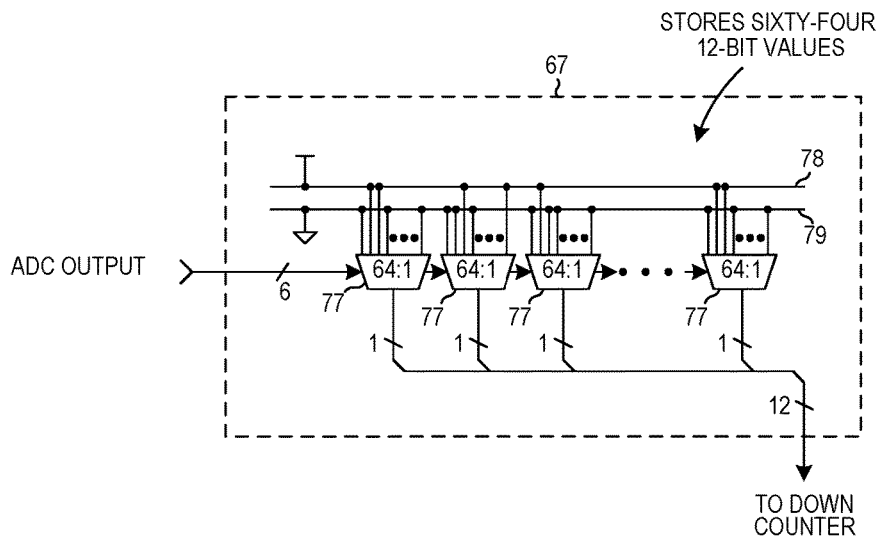
FIG. 5 is a more detailed circuit diagram of the hardware lookup table circuit in the controller integrated circuit of FIG. 3.

FIG. 5 is a more detailed diagram of one specific example of the hardware lookup table circuit (HW LUT) 67 of FIG. 3. The HW LUT 67 includes twelve 64:1 multiplexers 77. Each multiplexer input lead is coupled either to a digital logic high signal line 78, or to a digital logic low signal line 79. How the twelve first input leads of the multiplexers are coupled to the high and low signal lines determines the 12-bit output value that will be output if the 6-bit ADC OUTPUT value received onto the HW LUT is 000000. Similarly, how the twelve second input leads of the multiplexers are coupled to the high and low signal lines determines the 12-bit output value that will be output if the 6-bit ADC OUTPUT value received onto the HW LUT is 000001, and so forth. The HW LUT effectively stores sixty-four 12-bit values. Which value it is that is output by the HW LUT is determined by the incoming 6-bit ADC OUTPUT value.

In the circuit of FIG. 3, the ADC 72 and the HW LUT 67 together operate to supply a 12-bit value onto the DIN input leads of the down counter 66, where the particular 12-bit value supplied is a function of the magnitude of the signal S/H OUT. If the offset detector 47 detects a relatively large $I_C$ offset (which corresponds to a relatively large 101JT) then the ADC and HW LUT supply a smaller 12-bit value to the down counter 66, whereas if the offset detector 47 detects a relatively small $I_C$ offset (which corresponds to a relatively small $I_{OUT}$) then the ADC and HW LUT supply a larger 12-bit value to the down counter 66.

FIG. 3 is a simplified circuit diagram of a specific example of the controller integrated circuit 17. The complete circuit actually includes a small amount of additional circuitry that ensures that the on time of the main switch does not exceed a predetermined time in any one switching cycle. The HW LUT is loaded such that the dead time in each switching cycle is of at least of a predetermined duration.

Figure 6:
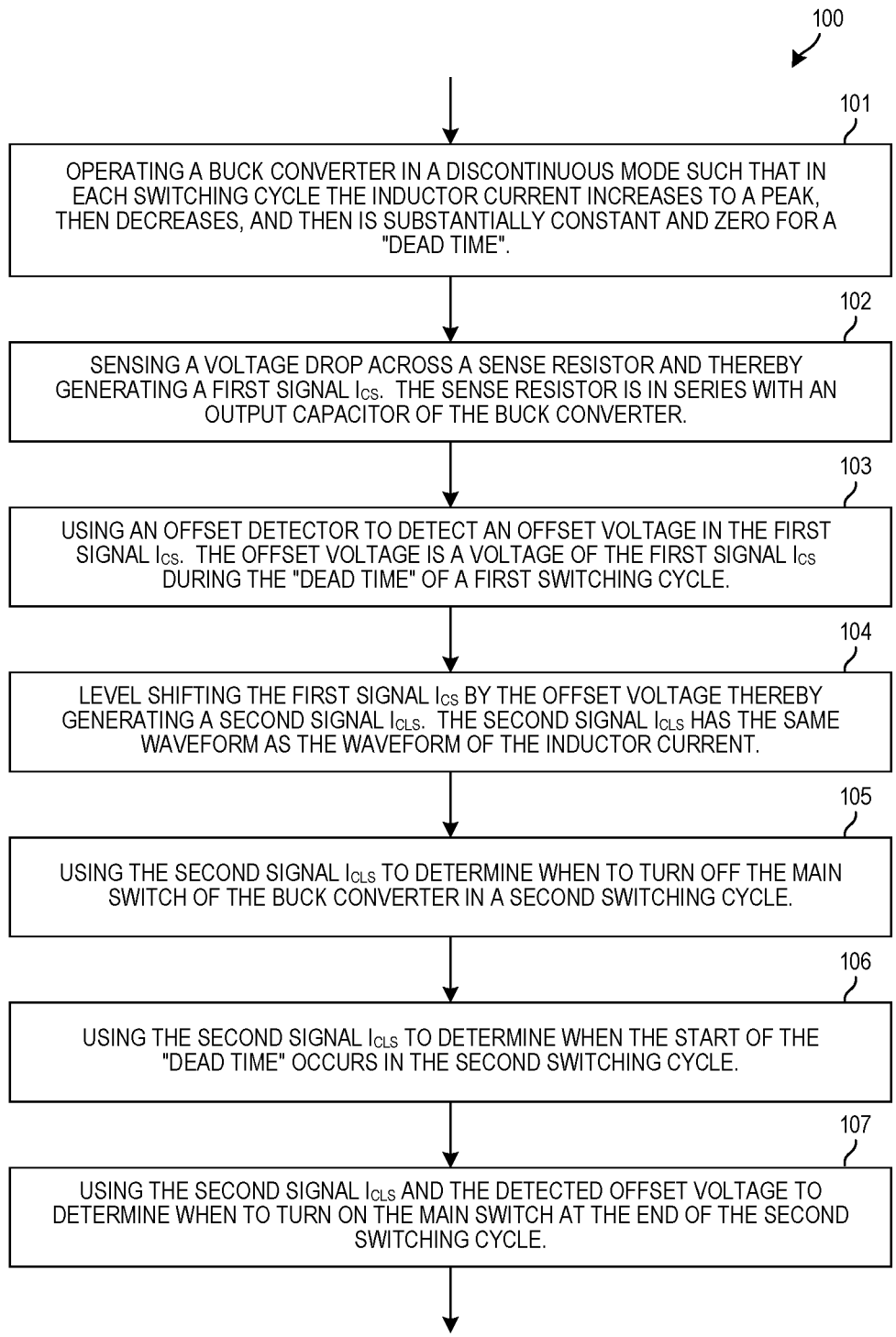
FIG. 6 is a flowchart of a method in accordance with one novel aspect.

FIG. 6 is a flowchart of a method 100 of controlling a buck converter in accordance with one novel aspect. The buck converter is operated (step 101) in a discontinuous mode such that in each switching cycle the inductor current increases to a peak, then decreases, and then is substantially constant and zero for a "dead time". A voltage drop across a sense resistor is sensed (step 102) thereby generating a first signal ICS. The sense resistor is in series with an output capacitor of the buck converter. An offset voltage in the first signal $I_{CS}$ is then detected (step 103), where this offset voltage is the voltage of the signal $I_{CS}$ during the "dead time". The signal $I_{CS}$ is then level shifted (step 104) by the amount of the detected offset voltage, thereby generating a second level-shifted signal $I_{CLS}$. The second level-shifted signal $I_{CLS}$ has the same waveform as the waveform of the current flowing in the inductor. The second level-shifted signal $I_{CLS}$ is used to determine (step 105) when in a second switching cycle to turn off the main switch of the buck converter. The second level-shifted signal $I_{CLS}$ is used to determine (step 106) when the start of the dead time occurs in the second switching cycle. The second level-shifted signal $I_{CLS}$ and the detected offset voltage are used to determine (step 107) when to turn on the main switch at the end of the second switching cycle.

In a preferred embodiment, all of these steps 101-107 are performed by an inexpensive controller integrated circuit that is a companion integrated circuit for a high-volume production and highly silicon-area-optimized general purpose microcontroller integrated circuit. The controller integrated circuit comprises no digital processor that fetches and executes any processor-executable instructions from any memory. Due to the microcontroller integrated circuit being produced in high volumes for other applications and due to the microcontroller integrated circuit being a highly silicon-area-optimized general purpose microcontroller, the cost of the overall control circuitry can be advantageously low. The absence of a current sensor in the inductor current path allows the cost of the overall control circuitry to be further reduced, and simultaneously allows fast detection of overload conditions and correspondingly fast overload protection shutdown.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

I claim:

1. A method comprising:
    generating a voltage signal in a controller of a buck converter between a first input terminal and a second input terminal;
    (a) using an analog amplifier to amplify the voltage signal thereby generating a first analog signal, wherein the voltage signal is a voltage signal across a resistor during first and second switching cycles of the buck converter;
    (b) using an offset detector to detect an offset voltage in the first analog signal;
    (c) using a level shift circuit to level shift the first analog signal by the offset voltage thereby generating a second analog signal, wherein the second analog signal is a level-shifted version of the first analog signal;
    (d) detecting when the second analog signal exhibits a first characteristic during the second switching cycle;
    (e) in response to the detecting of (d) deasserting a first output signal onto a first output terminal, wherein the deasserting of the first output signal causes a main switch to turn off during the second switching cycle;
    (f) detecting when the second analog signal exhibits a second characteristic during the second switching cycle;
    (g) in response to the detecting of (f) asserting a second output signal onto a second output terminal;
    (h) receiving an input trigger signal onto an input terminal, wherein the input trigger signal is received during the second switching cycle; and
    (i) in response to the receiving of (h) asserting the first output signal, wherein the asserting of the first output signal causes the main switch to turn on at the end of the second switching cycle.

2. The method of claim 1, wherein in a first portion of the first switching cycle there is current flow in an inductor of the buck converter whereas in a second portion of the first switching cycle there is substantially no current flow in the inductor.

3. The method of claim 2, wherein the offset voltage of (b) is a voltage that is proportional to the voltage of the first analog signal in a second portion of the first switching cycle.

4. The method of claim 1, wherein in a first portion of a second switching cycle there is current flow in an inductor of the buck converter whereas in a second portion of the second switching cycle there is substantially no current flow in the inductor.

5. The method of claim 4, wherein the detecting in (f) of when the second analog signal exhibits the second characteristic is a detecting of when the second analog signal stops decreasing and levels out to a constant value at the beginning of the second portion of the second switching cycle.

6. The method of claim 4, wherein the detecting in (f) involves:
    (f1) detecting when the second analog signal decreases below a second reference voltage;
    (f2) in response to the detecting of (f1) generating first information;
    (f3) detecting when the second analog signal decreases below a third voltage; and
    (f4) in response to the detecting of (f2) generating second information; and
    (f5) using the first and second information to determine when the second analog signal stops decreasing and levels out to the constant value at the beginning of the second portion of the second switching cycle.

7. The method of claim 1, wherein the detecting in (d) of when the second analog signal exhibits the first characteristic in a detecting of when the second analog signal exceeds a reference voltage.

8. A method, comprising:
    generating a voltage signal in a controller of a buck converter between a first input terminal and a second input terminal;

(a) using an analog amplifier to amplify the voltage signal thereby generating a first analog signal, wherein the voltage signal is a voltage signal across a resistor during first and second switching cycles of the buck converter, wherein the first analog signal is proportional to a current flow through the resistor;

(b) using an offset detector to determine an offset voltage in the first analog signal;

(c) using a level shift circuit to level shift the first analog signal by the determined offset voltage thereby generating a second analog signal, wherein the second analog signal is a level-shifted version of the first analog signal; (d) detecting when the second analog signal exhibits a first characteristic during the second switching cycle;

(e) in response to the detecting of (d) deasserting a first output signal onto a first output terminal, wherein the deasserting of the first output signal causes a main switch to turn off during the second switching cycle;

(f) detecting when the second analog signal exhibits a second characteristic during the second switching cycle;

(g) in response to the detecting of (f) starting a timer, wherein the timer asserts a timer output signal an amount of time after the starting of the timer in (g); and (h) in response to the asserting of the timer output signal asserting the first output signal, wherein the asserting of the first output signal in (h) causes the main switch to turn on at the end of the second switching cycle.

9. The method of claim 8, wherein in a first portion of the first switching cycle there is current flow in an inductor of the buck converter whereas in a second portion of the first switching cycle there is substantially no current flow in the inductor.

10. The method of claim 9, wherein the offset voltage is a voltage that is proportional to the voltage of the first analog signal during the second portion of the first switching cycle.

11. The method of claim 8, wherein in a first portion of a second switching cycle there is current flow in an inductor of the buck converter whereas in a second portion of the second switching cycle there is substantially no current flow in the inductor.

12. The method of claim 8, wherein the amount of time in (g) is a function of the offset voltage.

13. The method of claim 8, wherein the amount of time in (g) is a nonlinear function of the offset voltage.

14. The method of claim 8, wherein the timer is a variable timer, wherein the amount of time in (g) is inversely proportional to the offset voltage such that a smaller offset voltage results in a larger amount of time and such that a larger offset voltage results in a smaller amount of time.

15. The method of claim 8, wherein the variable timer comprises an analog-to-digital converter, a lookup table circuit, and a counter, wherein the analog-to-digital converter supplies a multi-bit digital signal to the lookup table circuit, and wherein the lookup table circuit supplies a multi-bit count value to the counter, and wherein the counter outputs the timer output signal.

* * * * *